United States Patent Office 3,037,363
Patented June 5, 1962

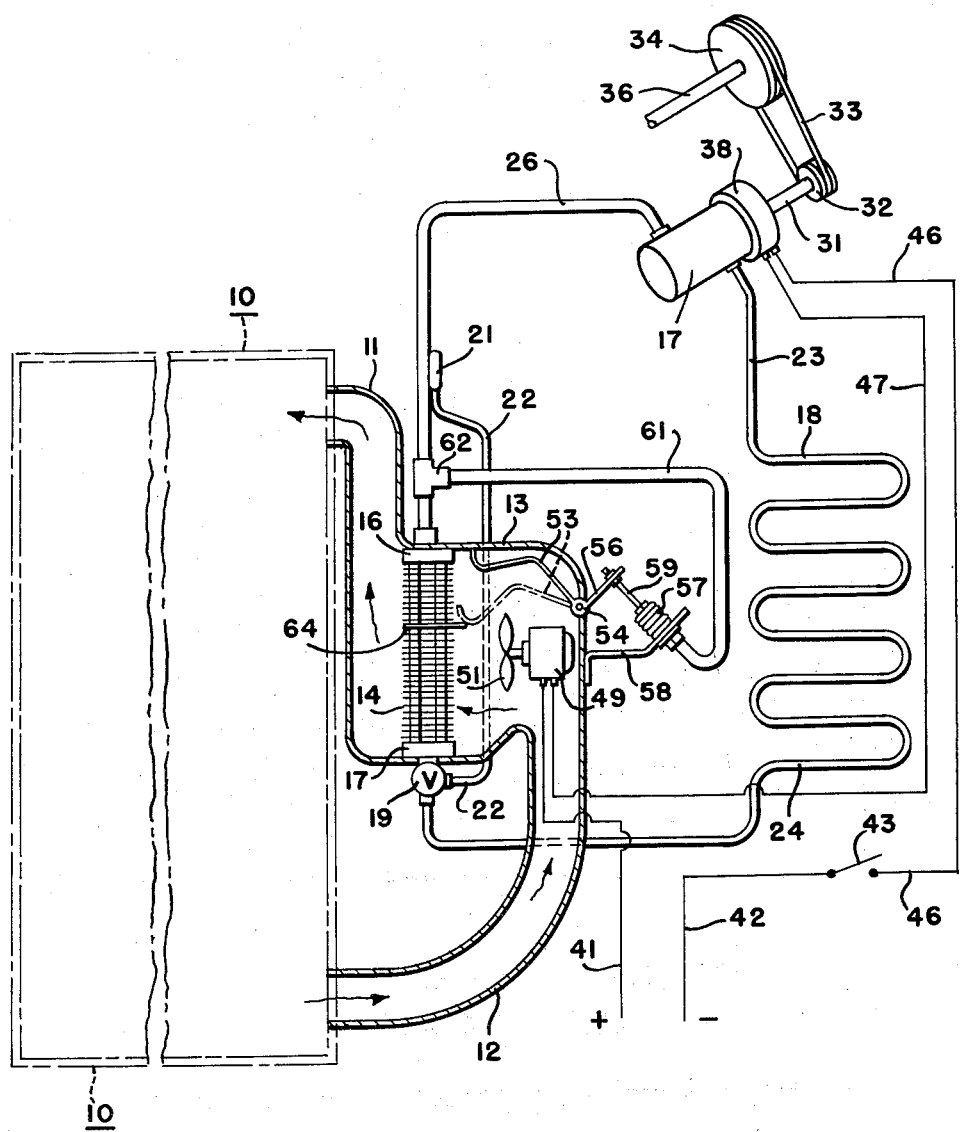

3,037,363
VEHICLE REFRIGERATING APPARATUS
James W. Jacobs, Dayton, Ohio, assignor to General Motors Corporation, Detroit, Mich., a corporation of Delaware
Filed Jan. 30, 1961, Ser. No. 85,606
6 Claims. (Cl. 62—133)

This invention relates to refrigerating apparatus and particularly to such apparatus in air condtioning systems for use in vehicles or automobiles and the like.

A number of problems exist in the construction, design and arrangement of refrigerating apparatus for use in air cooling vehicles such as passenger cars or automobiles. For example, the interior of a passenger compartment of an automobile is effectively cooled to a comfortable temperature while the automobile travels or is driven at moderate or fast speeds, but when the automobile is forced in travel at slower speeds or while it is stopped with its engine idling the temperature of the passenger compartment usually rises to an uncomfortable degree. This is caused primarily by the refrigerating system operating substantially at its full capacity during normally fast speed of the vehicle and operating at a lesser capacity during slow speed of the vehicle and/or when the vehicle engine is idling. The problem explained is peculiar to automobile air conditioning systems and I contemplate overcoming same by maintaining air discharged into the passenger compartment of a vehicle at a lower and more comfortable temperature as the vehicle travels at slow speeds and/or is stopped with its engine operating at idling speed.

An object of my invention is to provide an improved refrigerating system for use in an automobile air conditioning apparatus.

Another object of my invention is to maintain air discharged into a passenger compartment of an automobile while it is driven at slow speeds or when the engine of the automobile is idling at a lower temperature than that normally attained by a refrigerating system employed in an air cooling and conditioning apparatus carried by the automobile.

It is a further object of my invention to limit the area of an evaporator of a refrigerating system in an automobile air conditioning apparatus contacted by air circulated thereover to the active or colder area thereof and/or to reduce the volume of air flown over a portion of the evaporator whereby air discharged into the passenger compartment of the automobile will be effective to provide better cooling of the interior of the compartment during slow speeds of the automobile or while same is stopped and its engine operating at idling speed.

In carrying out the foregoing objects it is a more specific object of my invention to provide a damper means associated with an evaporator of a refrigerating system carried by an automobile and to operate or more the damper means automatically in response to conditions within the refrigerating system during slow speeds of the automobile into a position relative to the evaporator for reducing the area thereof contacted by air circulated thereover whereby the refrigerating system is rendered more effective to produce cooling within a passenger compartment of the automobile at such speeds.

Further objects and advantages of the present invention will be apparent from the following description, reference being had to the accompanying drawing wherein a preferred embodiment of the present invention is clearly shown.

In the drawing:

The illustration in the drawing of this application is a diagrammatic showing of a refrigerating system of an air conditioning apparatus for a vehicle such as an automobile wherein the compressor of the system is variably driven from the automobile engine and operates at speeds proportional thereto when clutched or drivingly connected to the engine.

Referring to the drawing, numeral 10 indicates in dot-dash lines walls of a passenger compartment of an automobile and the numerals 11 and 12 indicate inlet and outlet ducts communicating with the compartment and connected to a shroud 13, which encloses a refrigerant evaporator 14 of a refrigerating system, for confining circulating air in the body of the automobile. Evaporator 14 is preferably of the finned tube type with the upright tubes thereof connected at their ends to upper and lower headers or manifolds 16 and 17 respectively secured to shroud 13. The refrigerating system or apparatus of an air cooling or conditioning arrangement carried by the vehicle includes, in addition to evaporator 14, a compressor 17, a condenser 18, an expansion valve or means 19, for admitting liquid refrigerant to the evaporator, and a thermal bulb 21 connected to valve 19 by a conduit 22 having an expandible and contractible temperature responsive fluid sealed therein. A conduit 23 connects the discharge outlet of compressor 17 to condenser 18, a conduit 24 connects to the condenser 18 to the expansion valve 19 and another refrigerant return conduit 26 connects the upper outlet header 16 of evaporator 14 to the inlet side of compressor 17 to form the closed refrigerating system. Compressor 17 may be of any suitable or conventional construction and has an operating shaft (not shown) adapted to be clutched to a driving shaft 31 carrying a pulley 32 connected by a belt 33 to a pulley 34 mounted on a shaft 36 which is driven by the automobile engine (not shown). The clutch, generally represented by the numeral 38, intermediate shaft 31 and compressor 17 may be of any suitable or well-known construction and is preferably of an electromagnetic operated type such, for example, as is disclosed in the P. W. Maurer Patent No. 2,791,100 dated May 7, 1957, or in the J. Weibel, Jr. Patent No. 2,816,636 dated December 17, 1957. Since compressor 17 is directed clutched to shaft 31 it is variably driven from shaft 36 of the engine of the automobile at speeds and capacities proportional to various speeds of travel of the vehicle. An electric circuit connected to the storage battery of the vehicle or automobile is provided for the solenoid of the electromagnetic clutch 38. This circuit includes the wires 41 and 42, a manually actuated switch 43 located in passenger compartment 10, and wires 46 and 47 leading to and from clutch 38 to a constant speed motor 49 of a blower or fan 51 within shroud or housing 13. Switch 43 is adapted to simultaneously energize electric motor 49 and the electromagnetic clutch 38 which are connected in series relationship in the electric circuit.

In accordance with my invention I provide a means or damper 53 within shroud 13 which is pivotally mounted as at 54 and has an integral actuating part 56 projecting outwardly of and beyond the shroud. An expansible and contractible element such as a bellows or the like 57 has its one end stationarily secured to a plate 58 mounted or welded upon shroud 13 and has its movable opposite or closed end secured to a rod 59 attached to actuating part 56 of the damper means in any well known or conventional fashion. A pipe or conduit 61 secured to bellows 57 and communicating with the interior thereof leads to and is connected by a T-coupling 62 with the vaporized or gaseous refrigerant return conduit 26. A plate 64 is incorporated in the construction of an evaporator 14 at a preselected point intermediate the top and bottom thereof. Plate 64 projects from the evaporator 14 to provide a stop for downward movement of damper 53 and the upper wall of shroud 13 provides a stop for upward movement of this damper. The damper means 53 extends entirely across the interior of shroud 13 and is adapted to be shifted or moved therein by bellows 57 in response to pressure and temperature conditions existing within the refrigerating system, particularly in the suction or low pressure side thereof, at certain times for a purpose and in a manner to be hereinafter described.

The automobile or vehicle is adapted to travel at different speeds and since its engine has slow operations and faster operations, compressor 17 driven therefrom operates proportionally to operations thereof and the function of the compressor varies from substantially full capacity at high speeds of the vehicle engine to a lesser capacity at slow speeds of the engine or while the engine is idling. This renders the refrigerating system of the air cooling arrangement for the vehicle highly effective at certain times and less effective at certain other times to cool the passenger compartment 10. Therefore it is desired to insure that air discharged into the passenger compartment, particularly while the vehicle is traveling at a slow speed or during idling of the vehicle engine, will be at a sufficiently low temperature to have some refrigerating effect so as to maintain a more comfortable temperature within the compartment. Assume that the automobile engine is started and the vehicle is propelled thereby. Switch 43 is normally open to de-energize blower motor 49 and the solenoid operated clutch 38 whereby the compressor shaft is declutched from its driving shaft 31 and consequently from the automobile engine. If it is now desired to cool the passenger compartment 10, the operator of the vehicle closes switch 43 to complete an electric circuit through wires 41, 42, 46 and 47. This energizes both the solenoid of electromagnetic clutch 38 and blower motor 49. Clutch 38 thereupon connects shaft 31 to the shaft of compressor 17 and the compressor is operated by or driven from the vehicle engine through shaft 36 thereof, pulley 34, belt 33 and pulley 32. Motor 49 is also operated to cause blower or fan 51 to circulate air from compartment 10 through duct 12 into shroud 13, into contact with evaporator 14 and thereover back through duct 11 into the compartment. Operation of compressor 17 causes vaporized refrigerant from evaporator 14 to be drawn through conduit 26 into the intake side of the compressor. Refrigerant compressed by compressor 17 is discharged under pressure therefrom through conduit 23 into condenser 18. Condenser 18 is cooled in any suitable or conventional manner so as to condense and liquify refrigerant entering same. Liquid refrigerant flows by way of conduit 24 into evaporator 14 under the control of expansion valve 19 in the now well-known or conventional manner. Oil missible with the refrigerant, for lubricating operating parts of the compressor, is also normally circulated throughout the refrigerating system. The refrigerant in evaporator 14 absorbs heat from air circulated in contact therewith and thereover by blower or fan 51 and vaporizes in the evaporator for cooling the air to a predetermined low temperature. Cool air discharged from evaporator 14 is circulated through duct 11 into compartment 10 and over passengers therein to cool the compartment and the passengers to a temperature below that ambient the automobile. The temperature of compartment 10 is normally controlled by the amount of liquid refrigerant admitted to evaporator 14 through expansion valve 19, which valve is regulated by expansion and contraction of the fluid sealed within the thermal unit, bulb 21 and pipe 22, in response to temperatures of the refrigerant return conduit 26.

As long as the automobile or vehicle is being driven at a moderately fast speed, the refrigerating system functions satisfactorily or at substantially full capacity to provide a comfortable low temperature within the passenger compartment thereof. During such operation of the vehicle the suction pressure created by compressor 17 within conduit 26, pipe 61 and bellows 57 is low enough to maintain the bellows contracted and damper 53 is held in the position thereof shown by full lines in the drawing and a large volume of air is circulated over the evaporator 14 all of which is at this time active or maintained at a substantially uniform low temperature. However, when it is necessary to slow down the vehicle to a slow speed, such as in heavy traffic or when the vehicle is stopped for a period of time with its engine idling, the operation and consequently the capacity of compressor 17 of the refrigerating system is reduced. This reduced operating speed and/or capacity of compressor 17 causes an increase in pressure within conduit 26 which backs up gaseous refrigerant into evaporator 14 and renders an upper part thereof inactive since the temperature of that part of the evaporator increases above the temperature of the remainder or lower part thereof. In other words, a slow speed of the vehicle creates a considerable temperature differential between upper and lower parts or portions of evaporator 14. Bellows 57 being in communication with conduit 26 and evaporator 14 by way of pipe 61 is exposed to and senses this increased back or suction pressure within the low pressure side of the refrigerating system and consequently to the lesser capacity of compressor 17 which increased suction pressure expands the bellows. Expansion of bellows 57 moves rod 59 and damper projection 56 to shift the damper 53, about its pivotal mounting 54, into the position thereof indicated by the dotted lines in the drawing. Shifting or moving the damper means 53 as described and against the stop plate 64 reduces the area of evaporator 14 contacted by air circulated through shroud 13 and also reduces the volume of air flown or circulating over the evaporator. In other words, air circulated by blower or fan 51 is prevented from contacting the warmer upper part of evaporator 14 and is caused to circulate into contact with and over only the lower active or low temperature part of the evaporator. Here it is to be understood that damper 53 may at certain times come to rest at points intermediate the two positions thereof indicated in the drawing depending upon the intensity and duration of the higher refrigerant pressures within conduit 26 during slow speeds of the vehicle. The reduced volume of air discharged from evaporator 14 through duct 11 into the passenger compartment 10 is in this manner prevented from circulating over a higher temperature portion of evaporator 14 and the air is to be effectively cooled, during slow speed of the vehicle or during idling of its engine, to a sufficient low temperature as to prevent the interior of compartment 10 from rising to a temperature corresponding to the temperature ambient thereto.

When the vehicle is again driven at a fast or moderately fast speed, the speed and consequently the capacity of compressor 17 is increased whereby the suction or back pressure adjacent the compressor intake side is reduced and all surfaces of the evaporator 14 become active or are reduced to a predetermined low temperature. As this occurs, bellows 57 contracts to shift the damper 53 into the position thereof indicated by the full lines in the drawing and increase the volume of air flown over evaporator 14 during substantially full operating capacity of the compressor of the refrigerating system. Thus, by overcoming a problem existing in refrigerating systems having a variable speed compressor driven directly from a vehicle engine, I not only balance the capacity of the evaporator of the system with that of the compressor thereof but also maintain the temperature within the compartment of the vehicle below that normally obtainable therein to render passengers occupying the compartment more comfortable during slow speeds of the vehicle and/or during a time when the vehicle is standing still with its engine idling.

From the foregoing it should be apparent that there is provided an improved refrigerating air-cooling system for a vehicle wherein the compressor of the system, driven by variable speed of the engine of the vehicle, creates conditions in the refrigerating system which are utilized to correct or eliminate malfunctions of the system in operations thereof during different speeds of travel of the vehicle. In this connection I have provided a refrigerating system for an automobile air conditioning apparatus having means therein responsive to operating the engine of the automobile only at slow speeds for rendering the evaporator of the refrigerating system effective to cool air discharged to a passenger compartment of the automobile to a lower temperature. This is attained in the present disclosure by reducing the area of the evaporator of the refrigerating system contacted by air circulating thereover and/or by reducing the volume of air flown over the evaporator so that the reduced amount of air discharged into a compartment of a vehicle will be at a low temperature sufficient to produce some refrigerating effect within the compartment for preventing the interior thereof from increasing to a temperature corresponding to the temperature of air ambient the compartment during certain operations of the vehicle. The improvement herein disclosed functions automatically to produce refrigeration in a passenger compartment of a vehicle by temporarily preventing circulation of air over a subnormal temperatured portion of an evaporator of a refrigerating system carried by the vehicle.

While the embodiment of the present invention as herein disclosed constitutes a preferred form, it is to be understood that other forms might be adopted.

What is claimed is as follows:

1. In a vehicle adapted to travel at different rates of motion, an engine having slow operations and faster operations for propelling said vehicle, a refrigerating system carried by said vehicle comprising an evaporator, a condenser, a compressor and refrigerant fluid flow conduit connections therebetween, means for variably driving said compressor from the engine at speeds proportional to operations of said engine, conditions within said refrigerating system being normal at substantially high speeds of said compressor and abnormal at relatively lower compressor speeds whereby one portion of said evaporator becomes ineffective to produce refrigeration in response to said lower speeds of the compressor, said vehicle being provided with a compartment therein, a shroud associated with said compartment having an air inlet and an air outlet communicating therewith, said evaporator being disposed in said shroud, means for circulating air to and fro the compartment through said shrould over and into contact with said evaporator therein to cool the air and reduce the temperature within said compartment, means cooperating with said evaporator and movable into a position with respect thereto for preventing air incoming to said shroud from flowing over said one portion of the evaporator in its return to said compartment, and means included in said refrigerating system rendered effective only during said lower speeds of the compressor thereof for moving said last-named means into said position.

2. In a vehicle adapted to travel at different rates of motion, an engine having slow operations and faster operations for propelling said vehicle, a refrigerating system carried by said vehicle comprising an evaporator, a condenser, a compressor and refrigerant fluid flow conduit connections therebetween, means for variably driving said compressor from the engine at speeds proportional to operations of said engine whereby at low speeds of the compressor one portion of said evaporator becomes ineffective to produce refrigeration, said vehicle being provided with a compartment, a shroud associated with said compartment having an air inlet and an air outlet communicating therewith, said evaporator being disposed in said shroud, means for circulating air to and fro the compartment through said shroud over and into contact with said evaporator therein to cool the air and reduce the temperature within said compartment, means cooperating with said evaporator and movable into a position relative thereto for preventing air incoming to said shroud from flowing over said one portion of the evaporator in its return to said compatment, and means rendered effective only upon said one portion of the evaporator becoming ineffective for moving said last-named means into said position.

3. In a vehicle adapted to travel at different rates of motion, an engine having slow operations and faster operations for propelling said vehicle, a refrigerating system carried by said vehicle comprising an evaporator, a condenser, a compressor and refrigerant fluid flow conduit connections therebetween, means for driving said compressor from said engine, said vehicle being provided with a compartment therein, a shroud associated with said compartment having an air inlet and an air outlet communicating therewith, said evaporator being disposed in said shroud, means for circulating air to and fro the compartment through said shroud over and into contact with said evaporator therein to cool the air and reduce the temperature within said compartment, said compressor being driven at substantially its full capacity while the engine operates fast and at a lesser capacity while said engine operates slowly, said lesser capacity of the compressor causing one portion of said evaporator to become ineffective to produce refrigeration, means cooperating with said evaporator and movable into a position relative thereto for preventing air incoming to said shroud from flowing over said one portion of the evaporator in its return to said compartment, and means rendered effective only upon said one portion of the evaporator becoming ineffective for moving said last-named means into said position.

4. In a vehicle adapted to travel at different rates of motion, an engine having slow operations and faster operations for propelling said vehicle, a refrigerating system carried by said vehicle comprising an evaporator, a condenser, a compressor and refrigerant fluid flow conduit connections therebetween, means for variably driving said compressor from the engine at speeds proportional to operations of said engine, conditions within said refrigerating system being normal at substantially high speeds of said compressor and abnormal at relatively lower compressor speeds whereby one portion of said evaporator becomes ineffective to produce refrigeration in response to said lower speeds of the compressor, said vehicle being provided with a passenger compartment, a shroud outside said compartment having an air inlet and an air outlet communicating therewith, said evaporator being disposed in said shroud, means for circulating air to and fro the compartment through said shroud over and into contact with said evaporator therein to cool the air and reduce the temperature within said passenger compartment, a damper within said shroud located intermediate its inlet and the evaporator therein, said damper being movable into a position for blocking off said one portion of said evaporator and preventing air incoming to the shroud from contacting same, and means included in said refrigerating system rendered effective only during said lower speeds of the compressor thereof for moving said damper into said position.

5. In a vehicle adapted to travel at different rates of motion, an engine having slow operations and faster operations for propelling said vehicle, a refrigerating system carried by said vehicle comprising an evaporator, a condenser, a compressor and refrigerant fluid flow conduit connections therebetween, means for variably driving said compressor from the engine at speeds proportional to operations of said engine whereby at low speeds of the compressor one portion of said evaporator becomes ineffective to produce refrigeration, said vehicle being provided with a passenger compartment, a shroud outside said compartment having an air inlet and an air outlet communicating therewith, said evaporator being disposed in said shroud, means for circulating air to and fro the compartment through said shroud over and into contact with said evaporator therein to cool the air and reduce the temperature within said passenger compartment, a damper within said shroud located intermediate its inlet and the evaporator therein, said damper being movable into a position for blocking off said one portion of said evaporator and preventing air incoming to the shroud from contacting same, and means rendered effective only upon said one portion of the evaporator becoming ineffective for moving said damper into said position.

6. In a vehicle adapted to travel at different rates of motion, an engine having slow operations and faster operations for propelling said vehicle, a refrigerating system carried by said vehicle comprising an evaporator, a condenser, a compressor and refrigerant fluid flow conduit connections therebetween, means for driving said compressor from said engine, said vehicle being provided with a passenger compartment, a shroud outside said compartment having an air inlet and an air outlet communicating therewith, said evaporator being disposed in said shroud, means for circulating air to and fro the compartment through said shroud over and into contact with said evaporator therein to cool the air and reduce the temperature within said passenger compartment, said compressor being driven at substantially its full capacity while the engine operates fast and at a lesser capacity while said engine operates slowly, said lesser capacity of the compressor causing one portion of said evaporator to become ineffective to produce refrigeration, a damper within said shroud located intermediate its inlet and the evaporator therein, said damper being movable into a position for blocking off said one portion of said evaporator and preventing air incoming to the shroud from contacting same, and means rendered effective only upon said one portion of the evaporator becoming ineffective for moving said damper into said position.

References Cited in the file of this patent

UNITED STATES PATENTS

| | | |
|---|---|---|
| 2,477,351 | Spofford | July 26, 1949 |
| 2,656,685 | Borgerd | Oct. 27, 1953 |
| 2,892,319 | Jacobs | June 30, 1959 |